Figure 1:
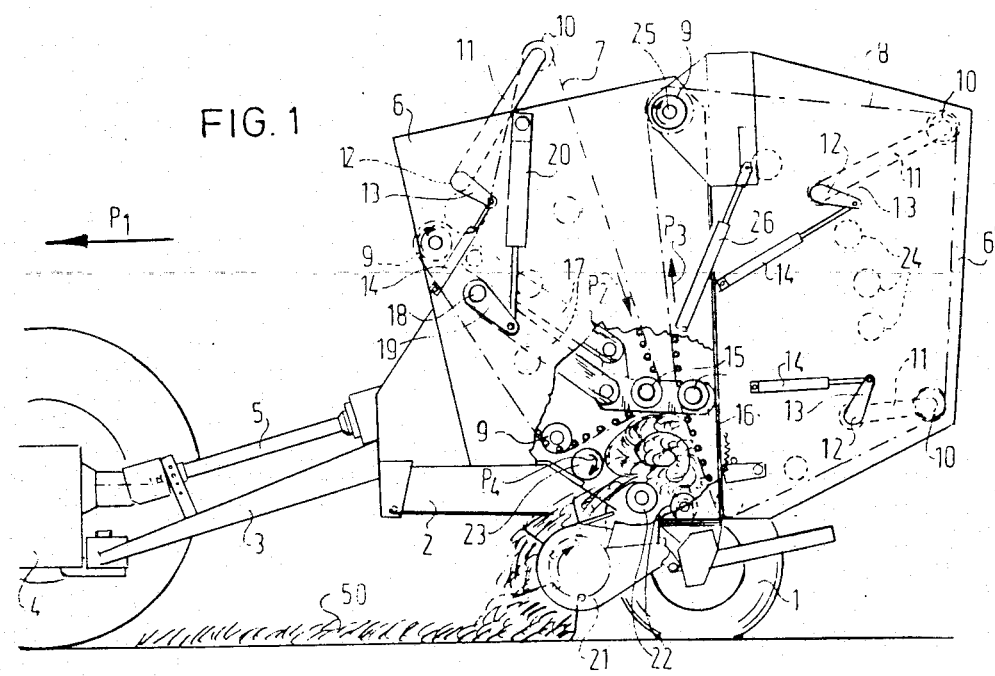

United States Patent [19]

Vissers et al.

[11] Patent Number: 4,550,557
[45] Date of Patent: Nov. 5, 1985

[54] DEVICE TO FORM CROP INTO ROUND BALES

[75] Inventors: Hermanus H. Vissers, Nieuw-Vennep; Jan Wondergem, Rijsenhout, both of Netherlands

[73] Assignee: Multinorm B.V., Nieuw-Vennep, Netherlands

[21] Appl. No.: 606,246

[22] Filed: May 2, 1984

[30] Foreign Application Priority Data

May 9, 1983 [NL] Netherlands ............... 8301647

[51] Int. Cl.⁴ .................................. A01D 39/00
[52] U.S. Cl. ................................. 56/341; 100/89
[58] Field of Search .................... 56/341; 100/89

[56] References Cited

U.S. PATENT DOCUMENTS

| | | | |
|---|---|---|---|
| 3,894,484 | 7/1975 | Anstey et al. | 56/341 |
| 3,895,573 | 7/1975 | Phillips et al. | 56/341 |
| 3,992,987 | 11/1976 | Sereg | 56/341 |
| 4,121,513 | 10/1978 | Kopaska | 56/341 |
| 4,172,354 | 10/1979 | Vermeer | 56/341 |
| 4,198,804 | 4/1980 | Konekamp et al. | 56/341 |
| 4,252,057 | 2/1981 | Gheddert et al. | 56/341 |
| 4,258,619 | 3/1981 | Gheddert | 56/341 |
| 4,288,971 | 9/1981 | McClure | 100/89 |
| 4,339,907 | 7/1982 | Kopaska et al. | 56/341 |
| 4,386,493 | 7/1983 | Holdeman et al. | 56/341 |
| 4,391,187 | 7/1983 | Kuning et al. | 56/341 |
| 4,470,247 | 9/1984 | Mast | 56/341 |

*Primary Examiner*—Paul J. Hirsch
*Attorney, Agent, or Firm*—Diller, Ramik & Wight

[57] ABSTRACT

A roll baling device in where the hay is picked up and formed by a group of guiding and stretching members for endless belt-like elements arranged between and supported by two relatively spaced walls. A further group of cylindrical support elements are arranged in a substantially complete circle within the baling chamber and cooperate with the belts to limit the diameter of the round bale in accord with the diameter of the circle.

19 Claims, 7 Drawing Figures

DEVICE TO FORM CROP INTO ROUND BALES

The invention relates to a device for forming crop lying on the field into round bales, said device mainly comprising a frame movable across the field and having two relatively spaced walls, a group of guiding and stretching members arranged between and supported by said walls for guiding and maintaining the tension of one or more endless, belt-like elements and means for picking-up the crop from the ground.

A device of the kind set forth in the preamble delivers cylindrical bales in which the crop is compressed to a greater or lesser extent in dependence on the type of device i.e. a device in which the crop is compressed from the beginning whilst being wound or a device in which the compression of the crop takes place at the end of the winding operation. A disadvantage of the first-mentioned type of device is that the rolling belts which have to yield to the increasing diameter of the bale may be overloaded by excessive supply of crop so rupture of a belt may occur. The second type mentioned above has the inconvenience that the core of the bale is not rolled over, but irregularly compressed so that the crop cannot be satisfactorily distributed for consumption.

The invention has for its object to obviate the aforesaid disadvantages and provides to this end a device which is distinguished in that a group of supporting members connected with a wall is arranged inside the space bounded by an endless belt element, which supporting members are disposed in a circle.

Owing to these supporting members the endless belt-like element is urged against the supporting members at a given volume of received crop so that the yielding movement of the belt-like element is limited and rupture of the belt is avoided. Nevertheless right from the beginning of the bale formation the core of the bale is exerted to pressure so that the bale has a uniform density throughout its volume.

The device proposed by the invention can be readily adapted to the desired bale size, which depends on the kind of crop to be compressed. In accordance with the invention it is only necesary to this end to arrange the supporting elements in circles of different diameters, which can be achieved by fastening the rollers at a different place to the walls.

In order to improve the rolling effect from the beginning of the bale formation at least two belt-like elements are arranged between the walls, whose proximal active parts are converging at an angle to and away from the pick-up means. Thus the space formed between the active parts is small and the crop fed into said space will be subjected from the beginning to sufficient pressure during rolling of the crop.

In a preferred embodiment the invention proposes to pass the active parts of the two belt-like elements in between a pair of guide members arranged on a holder away from and towards the pick-up means. In this way during rolling of the crop the belts can be urged by higher pressure against the crop which is conducive to the compression of the crop.

It is preferred to design the frame with a pivotable part for releasing the formed bale after being tied up or packed. In this pivotable part one of the belt-like elements is supported.

The above-mentioned and further features will become further apparent from the following description of a few embodiments.

Figure 2:
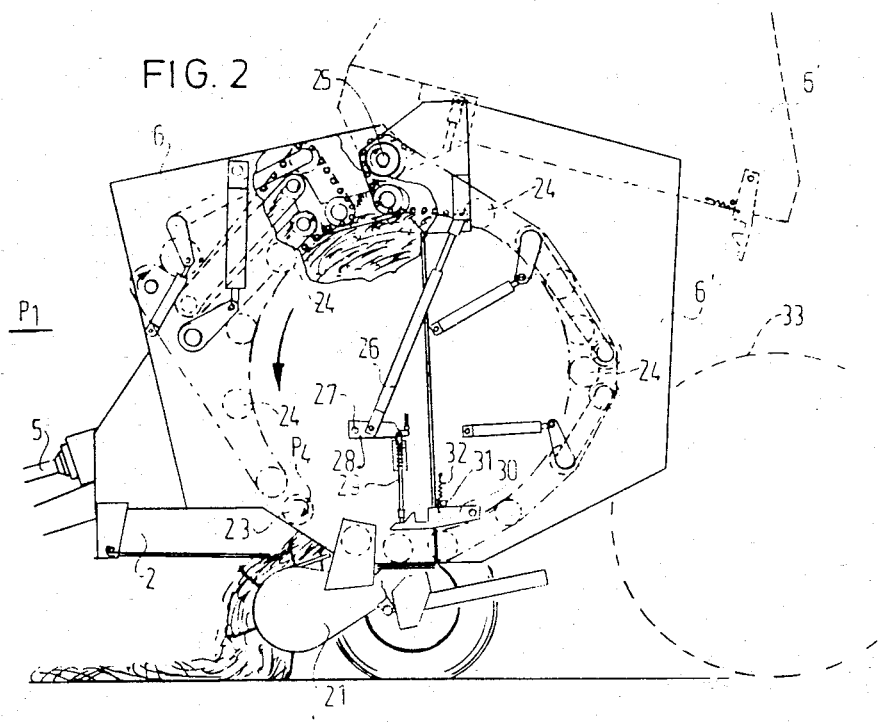
Figure 3:
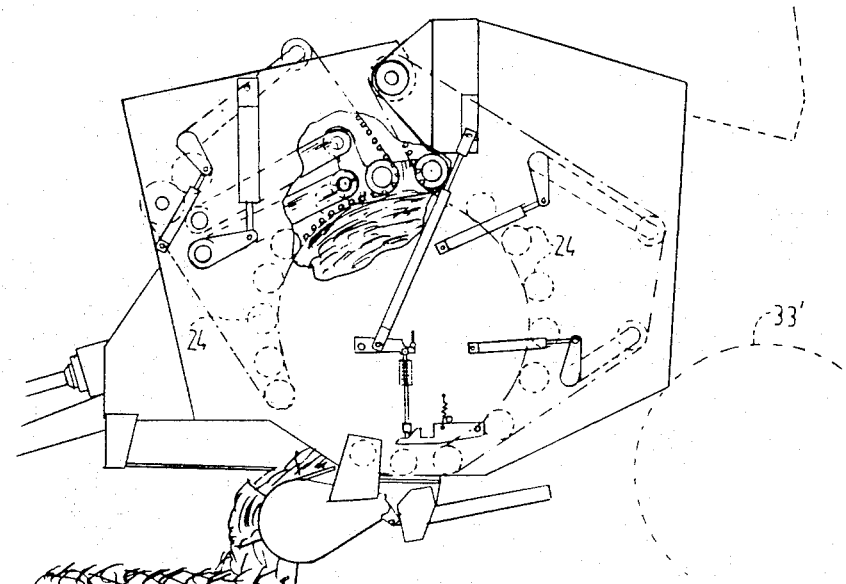
Figure 7:
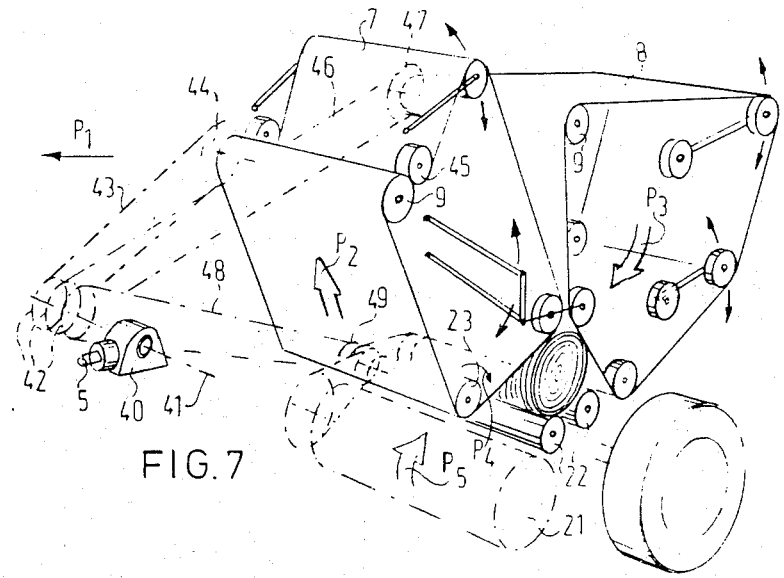
Figure 6:
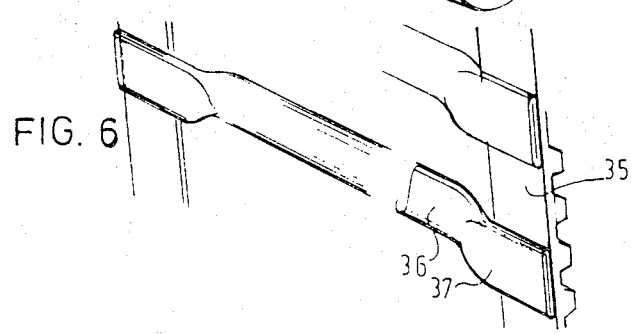
Figure 4:
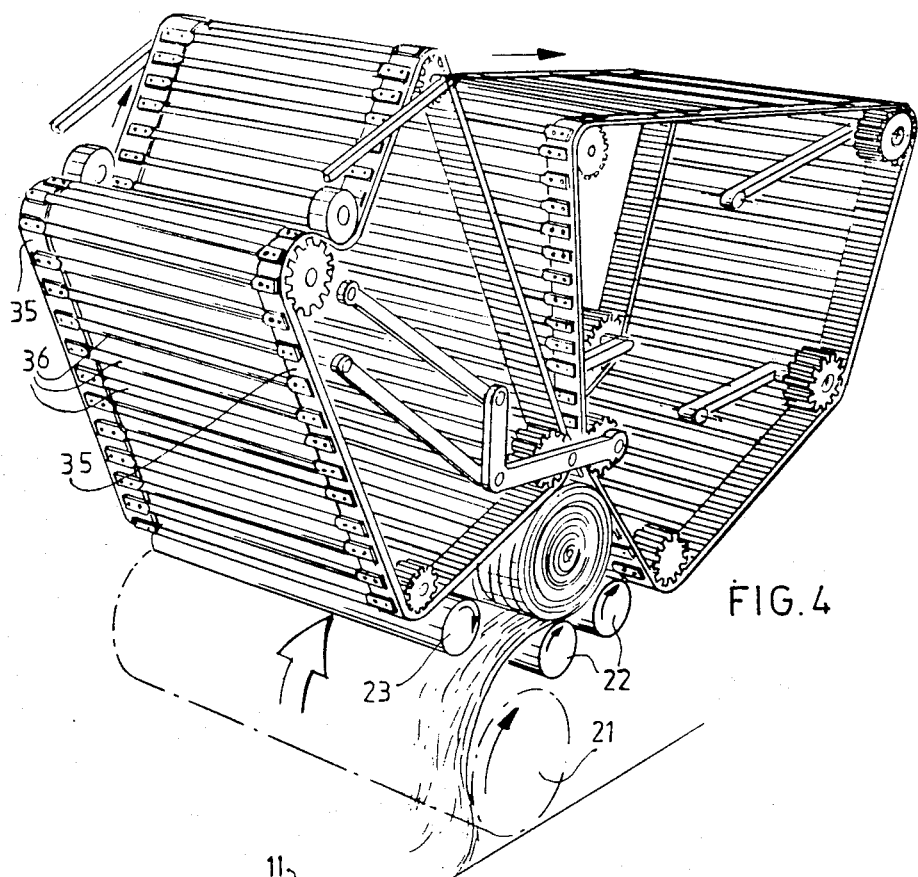
Figure 5:
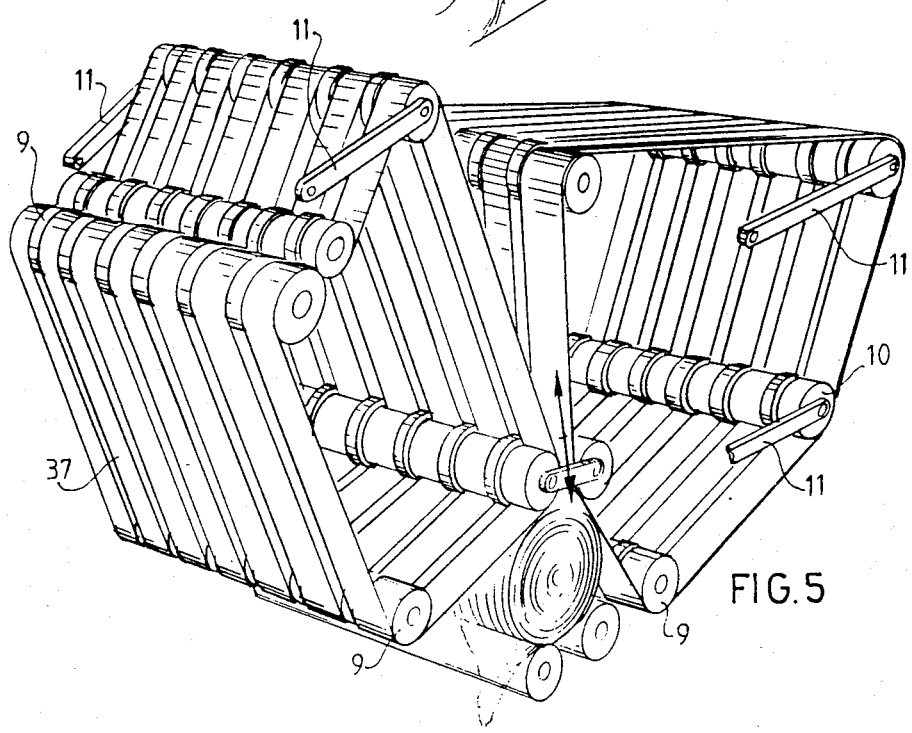

The drawing shows in:

FIG. 1 a schematic, vertical, longitudinal sectional view of a first embodiment of a device in accordance with the invention in an initial phase of the base formation, FIG. 2 a longitudinal sectional view like FIG. 1 of a device in the final phase of the bale formation, FIG. 3 a longitudinal sectional view like FIG. 1 of the device, the supporting rollers being displaced, FIGS. 4 and 5 perspective views of the belt run with guiding and stretching rollers in the form of a ladder belt or rope belt respectively, FIG. 6 a perspective view of a detail of the ladder belt of FIG. 4, FIG. 7 a perspective view like FIG. 4 showing schematically the drive of the various parts.

The device illuminated in the figures mainly comprises a frame 2 which is movable in the direction of the arrow P1 on ground wheels 1 across the field. The frame may be coupled through a drawbar 3 with an agricultural tractor 4, only the rear wheel of which is shown schematically. The device is driven through the power take-off shaft and the auxiliary shaft 5, which will be set out in detail hereinafter. The frame 2 may be constructed in any way of mainly comprises two parallel, vertical walls 6 spaced apart by a distance such that an endless, belt-like element (see FIGS. 4 or 5) can operate between them.

In the embodiment shown two endless belt-like elements 7 and 8 are arranged, each of which is passed around its own system of supporting rollers 9 and stretching rollers 10. The supporting rollers 9 are directly journalled on the inner side of the walls 6 and are, therefore, not displaceable with respect thereto. The stretching rollers 10 are each arranged on an arm 11, the other end of which is fastened to a spindle 12 journalled in the wall 6 and having fastened to it a lever arm 13. The free end of the lever arm 13 is coupled with a cylinder 14 supported by the wall 6. In dependence on the place and the shape the lever arm 13 with the associated cylinder 14 may be arranged on the outer side or the inner side respectively of the wall.

The proximal runs of the belts 7 and 8 are passed between a pair of guide members 15, which are journalled on a common carrier 16 one on each side thereof and on the inner sides of the walls 6. The common carrier 16 is connected by a parallel guide 17 with the inner side of the wall 6, whilst one of the pivotal shafts 18 of the parallel rods 17 is provided with a lever arm 19, the free end of which cooperates with a cylinder 20 supported by a side wall 6.

On the underside of the frame 2 a pick-up member is formed by a rotating pick-up mechanism 21 by which the crop 22 lying on the ground can be picked up.

Behind the pick-up means 21 two supporting rollers 22 are obliquely arranged for supporting the picked up crop.

Finally a roller 23 is arranged below the belt run 7 so as to be rotatably drivable in the direction of the arrow P4.

An essential feature of the invention is that a group of supporting rollers 24 is arranged in a circular configuration inside the walls 6 and also in the space bounded by the endless, belt-like elements 7 and 8.

The supporting members 24 may be designed in any way and they serve to limit the maximum yielding movement of the belt runs 7 and 8, which is explained further with reference to FIGS. 2 and 3.

The frame is constructed so that its rear part can be tilted up, which rear part is formed by wall parts 6' pivotable about a horizontal pivotal shaft 25. The pivotal shaft 25 coincides with one of the rotary axes of the guide rollers 9 of the belt-like elements 8. For tilting up said part a hydraulic ram 26 is provided, the upper end part of which is pivotally connected with the tiltable part 6', whereas the lower end is fastened to an arm 28 which is pivotable about a stub shaft 27 and the free end of which actuates a pressure pin 29, which is slidably fastened to the outer side of the fixed wall 6. The lower end of the pin 29 bears on the nose-shaped end part of a lock bolt 30, which is pivotally connected with the movable wall part 6'. The recess in the lock bolt 30 snaps around a locking pin 31 in the fixed wall part 6 by the tension of the spring 32. The locking mechanism may be provided on one side or on both sides of the device.

The device described above operates as follows: When the device is moved in the direction of the arrow P1 across the field the pick-up means 21 can pick up the crop 22 and feed it into a space by the lower parts of the proximal runs of the belt-like elements 7, 8, the roller 23 and finally the supporting rollers 22 (see FIG. 1). It appears that owing to the low position of the guide members 15 the space above the supporting rollers 22 is relatively small so that the core of the bale to be formed is compressed already in an early stage. The required rolling effect is obtained by driving the belt-like element 7 or 8 respectively in the direction of the arrow P2 or P3 respectively so that the crop is rolled up in anti-clockwise direction. The roller 23 ensures that no crop will be carried along by the lower run of the belt 7.

By feeding further crop into the space decribed above pressure is exerted on the lower ends of the belt runs, which will yield whilst urging the guide members 15 upwards. The upward movement of the guide members is however, counteracted by the pressure in the cylinder 20 so that a given pressure is constantly exerted on the crop.

The belt runs will diverge from one another because more space is required to receive more crop. Therefore, the stretching rollers 10 tend to move inwards, which is counteracted by the associated cylinders 14. Also in this manner the belt runs remain sufficiently taut.

The introduction of crop continues until the belts runs engaging the crop come into contact with the inner side of the supporting members 24. This limits the maximum deflection of the belt runs so that rupture of the belt can be avoided and no runs of the same belt-like element can come into contact with one another.

The end position is attained as shown in FIG. 2, from which it is apparent that a roll of a diameter corresponding with the inscribed circle of a supporting rollers 24 is formed.

When the bale is complete the rear part 6' can be tilted up by actuating the cylinder 26, which initially turns downwards the lever 28, which urges the pin 29 downwards and releases the latch 30. By further actuating the cylinder 26 the rear part 6' is turned upwards into the position indicated by the broken line in FIG. 2 The ready bale is indicated by the broken line 33.

FIG. 3 illustrates the situation in which the supporting rollers 24 are arranged on a circle of smaller diameter. This results in a bale 33' whose diameter is considerably smaller than that in FIG. 2.

It will be obvious that only the displacement of the roller 24 is determinative of the size of the final bale and this can be achieved by the same device in a simple manner.

FIGS. 4 and 5 show the course of the belt; in FIG. 4 the belt-like element is formed by a ladder belt. It comprises two relatively spaced, parallel toothed belt 35 between which rods 36 are fastened (see also FIG. 6). The shape of the rods may be arbitrary and in the embodiment shown the rod is formed by a tube flattened at both ends to form fastening tags 37. By means of bolts, nails or other material the rods 36 can be secured to the belt 35.

The fixed guide or stretching members are formed here by wheel-shaped elements along which the toothed belt 35 is passed. Thus construction reduces the risk of crop winding around the guide or stretching elements.

FIG. 5 shows that the belt-like element is formed by a plurality of parallel ropes and the guide or stretching members are formed by rollers journalled between the walls 6 and the arms 11 respectively.

FIG. 7 schematically shows the drive through the auxiliary shaft 5 from the agricultural tractor. The auxiliary shaft 5 drives a transmission in a casing 40, the output shaft 41 of which is transverse of the transport direction P1. At the end of the output shaft are arranged three driving discs 42, the outermost disc being coupled through an endless element 43 with a driving disc 44, the rotary axis of which coincides with one of the fixed guide members 9 of the belt 7. A pressure disc 45 is provided to ensure slip-free transmission between the driving roller 9 and the belt 7.

The second disc 42 is connected through a flexible, endless element 46 with a disc 47, which is fastened to the rotary shaft of a fixed roller 9 of the belt-like element 8.

The third disc is connected through a flexible element 48 with a disc 49, by which the rollers 22 or the pick-up means 21 respectively can be driven.

It will be obvious that in this way the central drive the belt-like elements 7, 8, the supporting rollers 22 and the pick-up means 21 can be simultaneously driven in the direction of the arrows P2, P3 and P5 respectively. When a roller 23 is provided, it can also be driven via the disc 49 in the direction of the arrow P4.

The invention is not limited to the embodiments described above. For example, the two belt-like elements 7, 8 may be united to form a single belt-like element, provided the parts of the pick-up means bounding the roll space for the bale to be formed converge to the rear.

The discharge of the bale by tilting up the rear part 6' may be performed in a different way, for example, about a vertical pivotal shaft without falling beyond the scope of the invention i.e. the disposition of the supporting rollers 24.

The construction of the belt-like elements 7, 8 may be chosen arbitrarily, for example, there may be conceived a continuous belt whose width corresponds to the distance between the sidewalls.

What is claimed is:

1. A device for forming crop lying on the ground into a round bale mainly comprising a frame movable across the field and having two relatively spaced walls, a group of guiding and stretching members arranged between and supported by said walls for guiding and stretching respectively one or more endless belt-like elements, means for picking up the crop from the ground, a group of supporting members journalled between said walls and arranged in a substantially complete circle, said supporting members cooperating with said endless belt-like elements to limit the diameter of the round bale in accord with the diameter of said circle.

2. A device as claimed in claim 1 characterized in that the supporting elements are releasably connected with said walls in order to enable a disposition of said elements in circles of different diameters.

3. A device as claimed in claim 1 or 2 characterized in that two belt-like elements are arranged between the walls, the proximal active runs of said elements being at an angle to one another and converging from the pick-up means.

4. A device as claimed in claim 3 characterized in that a pair of guide members is arranged on a holder adapted to be moved away from and towards the pickup means, the two active runs being passed in between said guide members.

5. A device as claimed in claim 4 characterized in that the movable holder is fastened to the ends of a pair of pivotal arms in order to maintain the holder in the same or substantially the same position in space.

6. A device as claimed in claim 5, characterized in that the or each pivotal arm is biassed by a power producing member, for example, a cylinder, spring or the like in a direction away from the pick-up means.

7. A device as claimed in claim 6 characterized in that the stretching members are biassed in an outward direction with respect to the belt-like element by a power producing means, for example, a cylinder, a spring or the like.

8. A device as claimed in claim 7 characterized in that the endless belt-like element is formed by two parallel toothed belts between which extend parallel rods, the guiding and stretching members being formed by roller wheels supporting said toothed belts.

9. A device as claimed in claim 7 characterized in that the endless belt-like element is formed by a plurality of parallel ropes, the guide members being formed by rollers supporting said ropes.

10. A device as claimed in claim 7 characterized in that the frame comprises an upwardly tiltable part, in which the pivotable part an endless belt-like element is arranged.

11. A device as claimed in claim 1 characterized in that one or more supporting rollers extending between the walls are arranged so as to join the pick-up means.

12. A device as claimed in claim 1 characterized in that at a distance above the pick-up means a roller is provided to rotate in opposite direction.

13. A device for forming crop lying on the ground into a compressed cylindrical bale, comprising:
a frame having two relatively spaced wall, said frame being movable across a field;
a plurality of cylindrical supporting elements extending between and rotatably journalled in said relatively spaced walls at circumferentially spaced positions with relation to each other, said cylindrical supporting elements cooperating with said walls to define a cylindrical bale chamber bounded in a substantially complete circle by said cylindrical supporting elements, two of said cylindrical supporting elements being sufficiently circumferentially spaced apart to define an inlet mouth through which crop may be introduced into said cylindrical bale chamber;
endless belt means for contacting said crop within said cylindrical bale chamber;
guide means fixed to said frame for guiding said endless belt means between a first position in which said continuous belt means extends within said cylindrical bale chamber to bear upon a small volume of crop entered through said inlet mouth and a second position in which said endless belt means has been displaced by continued expansion of said crop within said cylindrical bale chamber and is pressed against said cylindrical supporting elements by said crop;
drive means for driving said endless belt means whereby crop introduced initially into said cylindrical bale chamber is engaged by said endless belt means and rotated upon itself to form a cylindrical bale core and crop thereafter introduced is wound spirally onto said bale core; and
compressive means for resisting movement of said guide means from its first position to its second position as the bale is formed within said cylindrical bale chamber.

14. A device as claimed in claim 13 including means for fixing said plurality of cylindrical supporting elements in a plurality of fixed and selected positions defining circles of varying diameters.

15. A device as claimed in claim 13 wherein said endless belt means is located within said cylindrical bale chamber so that the lower one of said cylindrical supporting elements defining said inlet mouth and an adjacent element are always available to support the crop entering the cylindrical bale chamber.

16. A device as claimed in claim 15 wherein one of said supporting element is the upper one of those elements which define said inlet mouth, and means for driving said one of said cylindrical supporting elements so that its surface travels in a direction opposite to that of crop entering said inlet mouth.

17. A device as claimed in claim 16 wherein said endless belt means comprises two separate belt assemblied disposed in opposed relation to each other to present opposed flights which converge towards each other from said inlet mouth when said guide means is in said first position thereof.

18. In a crop baling device for picking up and forming a windrowed crop into a compressed cylindrical bale, the combination of:
roller means for defining a baling chamber of circular cross section which limits the diameter of the compressed cylindrical bale, said roller means comprising a plurality of rollers defining a substantially complete circle thereof and including two rollers which are sufficiently circumferentially spaced with respect to each other to define a crop inlet mouth;
crop pickup means for delivering a windrowed crop into said baling chamber through said inlet mouth;
endless belt means and drive means for driving said endless belt means, said endless belt means having first flight means entering said baling chamber in the region of said crop inlet mouth for engaging the crop and spiraling it back upon itself to initiate the formation of a cylindrical bale which thereafter progressively increases in size to displace said first flight means toward contact with a substantially complete circle of said rollers, said endless belt means also having second flight means outside said baling chamber which does not contact said rollers; and guiding means for maintaining said endless belt means under tension as said first flight means is displaced outwardly while the cylindrical bale increases in diameter until said first flight means is pressed against said substantially complete circle of rollers in encircling relation to said bale except at said crop inlet mouth while said second flight means is spaced from and out of contact with at least the majority of said substantially complete circle of rollers.

19. In a device as defined in claim 18 wherein said endless belt means comprises two separate belt assemblies each defining a portion of said first flight means, said first flight means extending from said region of said crop inlet mouth and passing outwardly from said baling chamber substantially diametrically of said crop inlet mouth and merging therewith with said second flight means.

* * * * *